Nov. 6, 1962 A. F. GILL 3,062,013
FISH CONSERVATION SYSTEM
Filed July 16, 1959 2 Sheets-Sheet 1

INVENTOR
Alan F. Gill
BY Alex. E. MacRae
ATTORNEY

Nov. 6, 1962 A. F. GILL 3,062,013
FISH CONSERVATION SYSTEM
Filed July 16, 1959 2 Sheets-Sheet 2

INVENTOR
Alan F. Gill
BY Alex. E. MacRae
ATTORNEY

… … … # 3,062,013
FISH CONSERVATION SYSTEM
Alan F. Gill, 2710 Tudor Ave., Victoria, British Columbia, Canada
Filed July 16, 1959, Ser. No. 827,640
4 Claims. (Cl. 61—1)

This invention relates to fish conservation systems and more particularly to means for directing the passage of fish in power dam, diversion dam, and tidal pond installations.

As is well known, certain fish, such as salmon, migrate up coastal rivers from the sea to spawn, and the young fish migrate in the opposite direction. With the widespread installation of power dams in such rivers, the problem of accommodating fiish migration is an acute one and many types of fishways have been proposed with a view to solving the problem. However, in many power dams and like installations, young fish may enter the turbines through the penstocks and thus be destroyed.

It is an object of this invention to provide a simple system for directing fish past obstacles in rivers and the like whereby fish mortality is substantially reduced.

Another object is to provide means whereby water may be permitted to enter or leave tidal ponds with the passage of a minimum amount of fish or other marine life.

The invention will be described with reference to the accompanying drawings, in which FIGURE 1 is a plan view of a system in accordance with the invention, FIGURE 2 is a vertical sectional view of the system shown in FIGURE 1.

This invention is based upon the fact that in considerable measure fish of the same age and species tend to remain substantially within the same range of depth. Thus, young downstream migrants of types that are commercially important in rivers of the northwestern region of the North American continent tend not to go below depths of the order of 85 to 100 feet.

Figure 1:
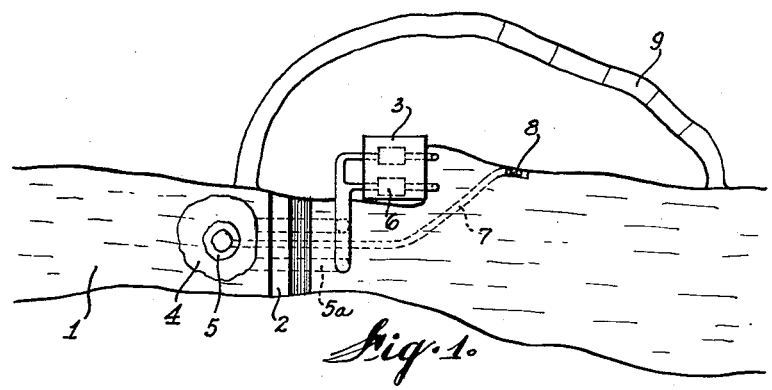
Figure 2:
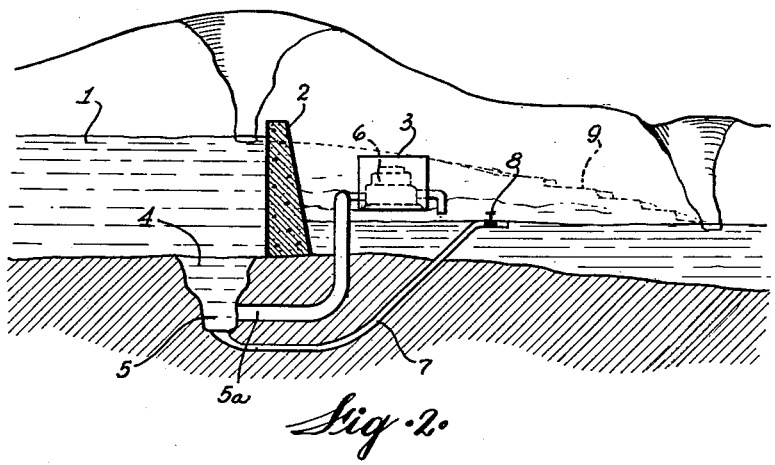

Referring to FIGURES 1 and 2, 1 is a river having a power dam 2 and associated power house 3. In this instance, the depth of the water upstream of the dam is less than 100 feet and ordinarily the penstock entrance would be located at a depth which would not prevent entrance of the young fish and resultant destruction thereof. In accordance with the invention a depression 4 is provided in the river bed closely adjacent the dam on the upstream side thereof. The depression 4 has a depth which increases the water depth above the base of the depression to at least approximately 85 feet and preferably of the order of 100 feet. A trap 5 comprises a second depression of smaller cross-sectional area than that of depression 4 at the base of the latter depression. Extending from the base of depression 4 is a conduit 5a leading to the penstock 6 of the power house, and extending, as shown, underneath the dam. It will be apparent that the conduit 5a may alternatively extend around or through the dam. A small conduit 7 extends from the base of trap 5 to the downstream side of the dam. The conduit 7 is provide with a valve 8 by means of which the conduit may be opened periodically to clear sedimentation from the trap.

The depression 4 has a cross-sectional area such that the velocity of descending water flowing through the same is held below a rate against which fish of all sizes can readily swim, i.e., approximately one foot per second. A fish ladder 9 by passing the dam may be provided.

Figure 4:
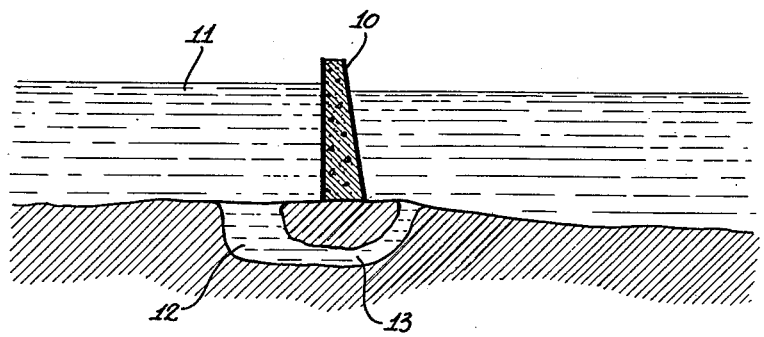
FIGURE 4 is a vertical sectional view of the system shown in FIGURE 3.
Figure 3:
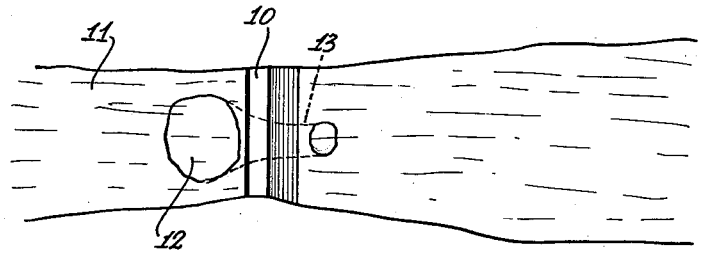
FIGURE 3 is a plan view of a modified system.

Referring to FIGURES 3 and 4, a diversion dam 10 is shown in a river 11, the depth of the water on the upstream side of the dam being less than 100 feet. In this instance, a depression 12, similar to depression 4, is provided on the upstream side of the dam and in proximity thereto. A tunnel 13 leads from the base of the depression 12 underneath the dam to the downstream side thereof. Again, the depression provides a depth of 100 feet or more to prevent passage of fish past the dam.

Figure 5:
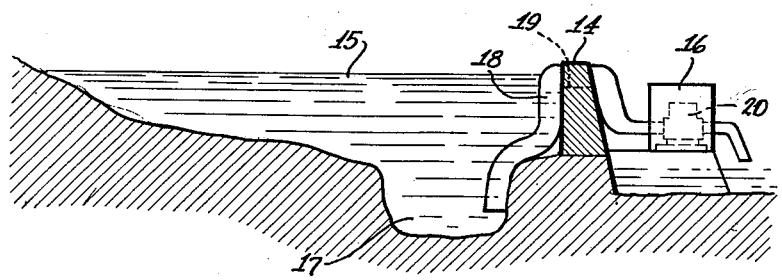
FIGURE 5 and 6 are vertical sectional views of modified forms of systems.

Referring to FIGURE 5, a power dam 14 is shown in a river 15 with associated power house 16. A depression 17, similar to depression 4, is provided on the upstream side of the dam. In this instance, the depth of the water on the upstream side of the dam is increased from below to about 100 feet above the base of the depression. A conduit 18 leads from the base of the depression upwardly along the upstream face of the dam and through the dam at 19 to connect with the penstock 20 of the power house. It will be apparent that the conduit may also be used without the depression when the depth of water above the dam exceeds 100 feet.

Figure 6:
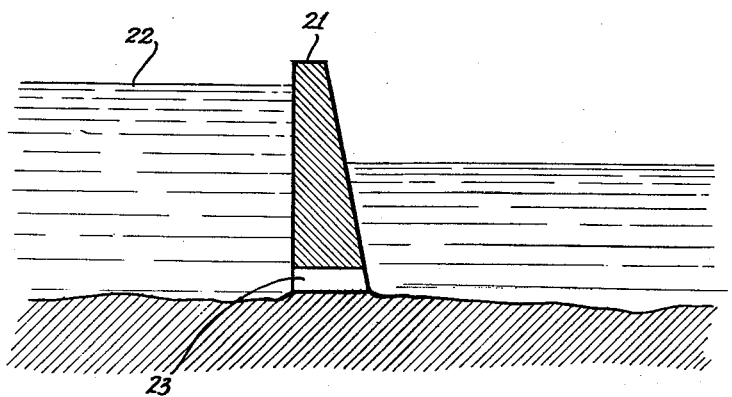

Referring to FIGURE 6, a dam 21 is shown in a river 22. In this instance, the height of the water at the upstream side of the dam is over 100 feet and thus a passage 23 extending through the dam is provided. The entrance to the passage at the upstream side of the dam is at a depth of the order of 85 to 100 feet. It will be apparent that a similar structure may be employed to permit entry or egress of water to or from tidal ponds or ponds tributary to bodies of fresh water.

It will be observed that, in each of the modifications described, means are provided for a major flow of water from the upstream side of a dam in such manner that fish are diverted therefrom. In each case, a channel for a minor flow of water and fish around the dam may be provided where desired.

I claim:

1. A fish protective device including in combination with a body of water having a dam maintaining upper and lower water levels on opposite sides thereof and with an outflow passage conducting water past said dam and provided with an adit communicating with the water of higher level and an exit discharging into the water of lower level and including in said outflow passage a device for using water and which device is destructive to fish passing through said outflow passage, said water on the high level side of said dam having a bed with a depression therein, said adit opening into and withdrawing water from a region of said depression which lies at a depth below said upper water level exceeding 85 feet, said depression having all of its cross-sectional areas between said bed and region so proportioned to the rate of discharge through said outflow passage that they will produce a current of flow in said depression between said region and said bed and into said adit of not more than one foot per second whereby to prevent entrainment of fish into said outflow passage.

2. The combination of claim 1 wherein said outflow passage extends beneath the lower surface of said dam.

3. The combination of claim 1 wherein said outflow passage extends laterally outwardly and around an end of said dam.

4. The combination of claim 1 wherein said depression has its sides sloping upwardly and outwardly from said adit to the bed of the upper level water.

References Cited in the file of this patent

UNITED STATES PATENTS

| | | | |
|---|---|---|---|
| 873,435 | Herschel | | Dec. 10, 1907 |
| 1,280,573 | Standish | | Oct. 1, 1918 |
| 2,163,102 | Odill | | June 20, 1939 |

FOREIGN PATENTS

| | | | |
|---|---|---|---|
| 289,474 | Germany | | Dec. 30, 1915 |
| 658,213 | France | | Jan. 22, 1929 |